(12) United States Patent
Inagaki et al.

(10) Patent No.: US 8,378,009 B2
(45) Date of Patent: Feb. 19, 2013

(54) PROCESS OF PRODUCING FLAME-RETARDANT SILANE-CROSSLINKED OLEFIN RESIN, INSULATED WIRE, AND PROCESS OF PRODUCING INSULATED WIRE

(75) Inventors: Tomonori Inagaki, Yokkaichi (JP); Masanobu Yoshimura, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 458 days.

(21) Appl. No.: 12/451,333

(22) PCT Filed: May 30, 2008

(86) PCT No.: PCT/JP2008/060051
§ 371 (c)(1), (2), (4) Date: Nov. 6, 2009

(87) PCT Pub. No.: WO2008/146921
PCT Pub. Date: Dec. 4, 2008

(65) Prior Publication Data
US 2010/0132974 A1 Jun. 3, 2010

(30) Foreign Application Priority Data
May 31, 2007 (JP) .................................. 2007-145520

(51) Int. Cl.
*C08J 3/20* (2006.01)
(52) U.S. Cl. ........................................................ 523/351
(58) Field of Classification Search .................... 523/351
See application file for complete search history.

(56) References Cited

U.S. PATENT DOCUMENTS

| 4,549,041 A | 10/1985 | Shingo et al. |
| 6,107,413 A * | 8/2000 | Mori ........................... 525/342 |
| 2003/0050378 A1 | 3/2003 | Blanchard et al. |
| 2005/0049346 A1 | 3/2005 | Blanchard et al. |

FOREIGN PATENT DOCUMENTS

| CN | 85 1 01356 A | 1/1987 |
| CN | 1206429 A | 1/1999 |
| EP | 1 170 114 A1 | 1/2002 |
| GB | 2156825 A * | 10/1985 |
| JP | A-56-163143 | 12/1981 |
| JP | A-60-101129 | 6/1985 |
| JP | A-60-147463 | 8/1985 |
| JP | A-63-37151 | 2/1988 |
| JP | A-5-32850 | 2/1993 |
| JP | A-2000-001578 | 1/2000 |
| JP | A-2000-212291 | 8/2000 |
| JP | A-2003-522267 | 7/2003 |
| JP | B2-3457560 | 10/2003 |
| WO | WO 97/22401 | 6/1997 |

OTHER PUBLICATIONS

Oct. 19, 2011 Office Action issued in Chinese Patent Application No. 200880018112.2 (with translation).
Chinese Office Action in Chinese Patent Application No. 200880018112.2; dated Dec. 13, 2010 (with English-language translation).
International Search Report issued in international application No. PCT/JP2008/060051 on Jun. 24, 2008.
Jun. 8, 2011 Office Action issued in German Patent Application No. 11 2008 001 402.7 (with translation).
Apr. 26, 2012 Office Action issued in Chinese Application No. 200880018112.2 (with English translation).
Oct. 2, 2012 Notification of Reason(s) for Refusal issued in Japanese Application No. 2007-145520 with English-language translation.
Nov. 15, 2012 Office Action issued in Chinese Patent Application No. 200880018112.2 (with translation).

* cited by examiner

*Primary Examiner* — Edward Cain
(74) *Attorney, Agent, or Firm* — Oliff & Berridge, PLC

(57) ABSTRACT

A process of producing a flame-retardant silane-crosslinked olefin resin, an insulated wire, and a process of producing an insulated wire. The process includes kneading and molding a silane graft batch containing a silane-grafted olefin resin in which a silane coupling agent is graft polymerized onto an olefin resin, a flame retardant batch in which an olefin resin is mixed with a flame retardant containing metal hydroxide, a catalyst batch in which an olefin resin is mixed with a silane crosslinking catalyst, and water crosslinking the batches after kneading and molding. A mass ratio of the flame retardant batch to the silane graft batch is 60:40 to 90:10, and the catalyst batch amount is 3 to 10 part by mass with respect to 100 part by mass of a component of the silane graft and flame retardant batches. The wire is prepared by covering a conductor with the silane-crosslinked olefin resin.

9 Claims, No Drawings

PROCESS OF PRODUCING FLAME-RETARDANT SILANE-CROSSLINKED OLEFIN RESIN, INSULATED WIRE, AND PROCESS OF PRODUCING INSULATED WIRE

TECHNICAL FIELD

The present invention relates to a process of producing a flame-retardant silane-crosslinked olefin resin, an insulated wire, and a process of producing an insulated wire, and specifically relates to a process of producing a flame-retardant silane-cross linked olefin resin, which is suitably used as a covering material of an insulated wire to be wired in an automobile, an electrical/electronic appliance, and other devices, an insulated wire, and a process of producing an insulated wire.

BACKGROUND ART

Conventionally, for an insulated wire used for wiring of parts for a car such as an automobile, parts for an electrical/electronic appliance, and parts for other devices, there has been widespread use of an insulated wire in which a conductor is covered with a vinyl chloride resin composition to which a halogenous flame retardant is added.

However, this kind of vinyl chloride resin composition includes halogen elements, so that it emits harmful halogenous gas into the atmosphere in case of car fire or at the time of disposing of an electrical/electronic appliance by incineration, causing environmental pollution.

From the view point of reducing loads on the global environment, an olefin resin composition containing an olefin resin such as polyethylene has been recently used as an alternative to the vinyl chloride resin composition. Because the olefin resin is flammable, metal hydroxide such as magnesium hydroxide is added as a flame retardant to the olefin resin composition in order to achieve sufficient flame retardancy.

When this kind of insulated wire is used in a hot environment of an automobile, for example, heat resistance is required. In order to improve heat resistance of an insulated wire, an insulating layer of the insulated wire is often crosslinked.

Examples of crosslinking include electron irradiation crosslinking, chemical crosslinking, and water crosslinking. Electron irradiation crosslinking and chemical crosslinking require expensive, large, specialized crosslinking equipment, which leads to an increase in the cost. Thus, water cross linking which does not have such a problem and allows for easy crosslinking is widely used in recent years.

For example, Japanese Patent Application Unexamined Publication No. 2000-1578 discloses a process of producing a flame-retardant silane-crosslinked polyolefin composition including the steps of forming a compound by kneading an olefin resin with metal hydroxide, a silane coupling agent, a cross-linking agent, a siloxane condensation catalyst, and other elements at once, and heating and molding the compound.

Japanese Patent No. 3457560 discloses a process of producing a flame-retardant silane-crosslinked polyolefin composition including the steps of kneading an A material in which a compound prepared by graft polymerizing a silane coupling agent onto an olefin resin is mixed with metal hydroxide, and a B material prepared by mixing an olefin resin with a cross-linking catalyst and a cross-linking agent, and heating, cross-linking, and molding them.

DISCLOSURE OF THE INVENTION

Problem to be Solved by the Invention

However, the process of Japanese Patent Application Unexamined Publication No. 2000-1578 forms the compound by mixing the olefin resin with the metal hydroxide and the silane coupling agent at once. Thus, water in the metal hydroxide reacts with the silane coupling agent and the silane coupling agent becomes hydrolyzed, which hinders graft reaction of the silane coupling agent. As a result, a gel-like material occurs by hydrolysis and appears on the surface of the molding to form asperities, and surface appearance after extrusion is impaired.

The process of Japanese Patent No. 3457560 mixes the A material containing the compound prepared by graft polymerizing the silane coupling agent onto the olefin resin with the metal hydroxide, and the metal hydroxide is dispersed in the A material by heating and mixing them. Thus, before kneading and heating the A material and the B material, water in the metal hydroxide reacts with the silane coupling agent grafted onto the olefin resin, and the silane coupling agent is hydrated. As a result, a gel-like material occurs by hydrolysis and appears on the molding to form asperities, and surface appearance after extrusion is impaired.

An object of the present invention is to overcome the problems described above and to provide a process of producing a flame-retardant silane-cross linked olefin resin excellent in surface appearance after extrusion, an insulated wire, and a process of producing an insulated wire.

Means for Solving Problem

To achieve the objects and in accordance with the purpose of the present invention, a process of producing a flame-retardant silane-crosslinked olefin resin according to the present invention includes the steps of kneading and molding a silane graft batch containing a silane-grafted olefin resin in which a silane coupling agent is graft polymerized onto an olefin resin, a flame retardant batch in which an olefin resin is mixed with a flame retardant containing metal hydroxide, a catalyst batch in which an olefin resin is mixed with a silane crosslinking catalyst, and water crosslinking a molding of the batches after the kneading and molding step.

It is preferable that a mass ratio of the flame retardant batch to the silane graft batch is in the range of 60:40 to 90:10, and the amount of the catalyst batch is in the range of 3 to 10 part by mass with respect to 100 part by mass of a component constituted of the silane graft batch and the flame retardant batch.

It is also preferable that the silane graft batch is prepared by heating and mixing 100 part by mass of the olefin resin with 0.5 to 5 part by mass of the silane coupling agent and 0.025 to 0.1 part by mass of an uncombined radical generating agent, the flame retardant batch is prepared by mixing 100 part by mass of the olefin resin with 100 to 500 part by mass of the metal hydroxide, and the catalyst batch is prepared by mixing 100 part by mass of the olefin resin with 0.5 to 5 part by mass of the silane coupling agent.

An insulated wire according to the present invention is prepared by covering a conductor with the flame-retardant silane-crosslinked olefin resin prepared by the process described above.

A process of producing an insulated wire according to the present invention includes the steps of kneading a silane graft batch containing a silane-grafted olefin resin prepared by graft polymerizing a silane coupling agent onto an olefin resin, a flame retardant batch prepared by mixing an olefin resin with a flame retardant containing metal hydroxide, and a catalyst batch prepared by mixing an olefin resin with a silane crosslinking catalyst, extrusion-covering a conductor with a composition of the kneaded batches, and water crosslinking the composition after the extrusion-covering step.

EFFECT OF THE INVENTION

In the process of producing the flame-retardant silane-cross linked olefin resin according to the present invention, the olefin resin not containing a flame retardant is mixed with the silane coupling agent, and the silane coupling agent is graft polymerized onto the olefin resin. Therefore, graft reaction of the silane coupling agent sufficiently proceeds, and it is avoided that the silane coupling agent is hydrolyzed by water in the flame retardant and graft reaction is hindered. Thus, a gel-like material caused by hydrolysis of the silane coupling agent does not occur, and surface appearance after extrusion of the molding becomes excellent.

The flame retardant is not mixed with the silane graft batch before the kneading and molding step, and the silane graft batch, the flame retardant batch, and the catalyst batch are kneaded in the kneading and molding step. Accordingly, it is avoided that the silane coupling agent which is grafted onto the olefin resin is hydrolyzed by water in the flame retardant before the kneading and molding step. Thus, a gel-like material caused by hydrolysis of the silane coupling agent does not occur, and surface appearance of the molding becomes excellent.

If the silane graft batch, the flame retardant batch, and the catalyst batch have the above-described compositions in the above-described amounts, excellence of surface appearance after extrusion is ensured.

If the mass ratios of the silane graft batch, the flame retardant batch, and the catalyst batch are in the above-described ranges, surface appearance after extrusion becomes more excellent.

Because the insulated wire according to the present invention is prepared by covering the conductor with the above-described flame-retardant silane-crosslinked olefin resin, surface appearance after extrusion becomes excellent.

The process of producing the insulated wire according to the present invention includes separately preparing the above-described silane graft batch, the above-described flame retardant batch, and the above-described catalyst batch, kneading the prepared batches, extrusion-covering the conductor with the composition of the kneaded batches, and water crosslinking the composition after the extrusion-covering step. Therefore, surface appearance after extrusion becomes excellent.

BEST MODE FOR CARRYING OUT THE INVENTION

A detailed description of preferred embodiments of the present invention will now be provided.

A process of producing a flame-retardant silane-cross linked olefin resin according to the present invention includes the steps of kneading and molding a silane graft batch containing a silane-grafted olefin resin prepared by graft polymerizing a silane coupling agent onto an olefin resin, a flame retardant batch prepared by mixing an olefin resin with a flame retardant containing metal hydroxide, and a catalyst batch prepared by mixing an olefin resin with a silane crosslinking catalyst, and water cross linking a molding of the batches after the kneading and molding step.

The silane graft batch, the flame retardant batch, and the catalyst batch are separately prepared before the kneading and molding step. The prepared batches are respectively extruded and formed into pellets. The three materials of the silane graft batch, the flame retardant batch, and the catalyst batch are separate before the kneading and molding step, and they are first kneaded in the kneading and molding step. In other words, the silane-grafted olefin resin of the silane graft batch is kneaded with the metal hydroxide of the flame retardant batch first in the kneading and molding step.

For kneading the three materials, a generally used kneader such as a Banbury mixer, a pressure kneader, a kneading extruder, a twin screw extruder, and a roll is preferably used. The three materials may be dry blended before the kneading and molding step preferably by using a generally used tumbler. A heating temperature during kneading is such a temperature that the resin flows, and is preferably a commonly applied temperature, e.g., temperatures of 100° C. to 250° C. A kneading time is preferably 0.1 to 15 minutes.

The composition obtained by kneading the three materials is molded immediately after kneading, and thereafter, the molding is water crosslinked. The molding is water crosslinked preferably by being subjected to vapor or water. Water crosslinking is preferably performed at temperatures of ordinary temperature to 90° C. for 48 or fewer hours and is more preferably performed at temperatures of 60° C. to 80° C. for 12 to 24 hours.

The degree of cross-linkage of the olefin resin obtained by water crosslinking is preferably 50% or more in view of heat resistance. In other words, the gel content is preferably 50% or more. The degree of cross-linkage is more preferably 60% or more. The degree of cross-linkage may be adjusted in accordance with the grafting amount of the silane coupling agent onto the olefin resin, the kind and amount of the silane crosslinking catalyst, water crosslinking conditions (temperature, time), and other factors.

In kneading, a mass ratio of the flame retardant batch to the silane graft batch is preferably within the range of 60:40 to 90:10 and is more preferably within the range of 60:40 to 70:30. If the amount of the silane graft batch is less than 10 mass %, the degree of cross-linkage by water crosslinking is easily lowered, and heat resistance is easily lowered. If the amount of the flame retardant batch is less than 60 mass %, flame retardancy is easily lowered.

The amount of the catalyst batch is preferably within the range of 3 to 10 part by mass and is more preferably within the range of 5 to 8 part by mass with respect to 100 part by mass of a component constituted of the silane graft batch and the flame retardant batch. If the amount of the catalyst batch is less than 3 part by mass, the degree of cross-linkage by water crosslinking is easily lowered, and heat resistance is easily lowered. If the amount is more than 10 part by mass, crosslinking proceeds excessively, and gelatification occurs to form asperities on the product.

The silane graft batch contains the silane-grafted olefin resin which is prepared by graft polymerizing the silane coupling agent onto the olefin resin. In order to prepare the silane-grafted olefin resin, the silane coupling agent and an uncombined radical generating agent are added to the olefin resin, for example, and the silane, coupling agent is graft polymerized onto the olefin resin while heating, kneading, and extruding them preferably by using an extruder. A heating temperature is preferably higher than a decomposition temperature of the uncombined radical generating agent and is determined as appropriate according to the kind of the uncombined radical generating agent used.

Examples of the olefin resin of the silane graft batch include polyolefin such as polyethylene and polypropylene, an ethylene copolymer such as an ethylene-alpha-olefin copolymer, an ethylene-vinyl acetate copolymer, an ethylene-acrylic ester copolymer, an ethylene-methacrylic ester copolymer, and a propylene copolymer such as a propylene-alpha-olefin copolymer, a propylene-vinyl acetate copolymer, a propylene-acrylic ester copolymer, a propylene-methacrylic ester copolymer. They may be used singly or in combination.

Among them, polyethylene, polypropylene, an ethylene-vinyl acetate copolymer, an ethylene-acrylic ester copolymer, and an ethylene-methacrylic ester copolymer are preferable.

Examples of polyethylene include high density polyethylene (HDPE), middle density polyethylene (MDPE), low density polyethylene (LDPE), linear low density polyethylene (LLDPE), ultralow density polyethylene, and metallocene ultralow density polyethylene. They may be used singly or in combination. Among them, metallocene ultralow density polyethylene is preferable.

The density of the olefin resin of the silane graft batch is preferably 0.901 g/cm$^3$ or less in view of excellent flexibility. In view of minimizing swelling of the silane-grafted olefin resin on exposure to gasoline and improving gasoline resistance, the density of the olefin resin of the silane graft batch is preferably 0.880 g/cm$^3$ or more because the degree of crystallization of the resin is lowered as the density decreases.

Thus, metallocene ultralow density polyethylene whose density is in the range of 0.880 to 0.901 g/cm$^3$ is especially preferable for the olefin resin of the silane graft batch. Such metallocene ultralow density polyethylene may be used singly, or two or more kinds of such metallocene ultralow density polyethylene may be used in combination.

Examples of the silane coupling agent include vinyl alkoxysilane such as vinyltrimethoxysilane, vinyltriethoxysilane, and vinyltributoxysilane, normal hexyl trimethoxysilane, vinylacetoxysilane, gamma-methacryloxypropyltrimethoxysilane, and gamma-methacryloxypropylmethyldimethoxysilane. They may be used singly or in combination.

The amount of the silane coupling agent is preferably within the range of 0.5 to 5 part by mass and is more preferably within the range of 3 to 5 part by mass with respect to 100 part by mass of the olefin resin. If the amount of the silane coupling agent is less than 0.5 part by mass, the grafting amount of the silane coupling agent is small and an enough degree of cross-linkage is not easily achieved. If the amount is more than 5 part by mass, crosslinking reaction proceeds excessively during kneading and a gel-like material easily occurs. As a result, asperities are easily formed on the product and mass productivity is easily impaired. In addition, melt viscosity becomes excessively high, which imposes an excessive load on the extruder and easily impairs workability.

The grafting amount of the silane coupling agent is preferably within the range of 0.1 to 5 mass %. The degree of cross-linkage is preferably 50% or more.

Examples of the uncombined radical generating agent include organic peroxide such as dicumyl peroxide (DCP), benzoyl peroxide, dichlorobenzoyl peroxide, di-tert-butyl peroxide, butyl peracetate, tert-butyl perbenzoate, and 2,5-dimethyl-2,5-di(tert-butyl peroxy)hexane.

Among them, dicumyl peroxide (DCP) is preferable. For example, when dicumyl peroxide (DCP) is used as the uncombined radical generating agent, a temperature for preparing the silane graft batch is preferably 200° C. or more in order to graft polymerize the silane coupling agent.

The amount of the uncombined radical generating agent is preferably within the range of 0.025 to 0.1 part by mass with respect to 100 part by mass of the olefin resin.

If the amount of the uncombined radical generating agent is less than 0.025 part by mass, graft reaction of the silane coupling agent does not easily proceed sufficiently, and a desired gel content is not easily achieved. If the amount is more than 0.1 part by mass, the percentage of molecules of the olefin resin which are cut by the uncombined radical generating agent becomes higher, and unintended peroxide crosslinking easily proceeds. Accordingly, crosslinking reaction of the olefin resin excessively proceeds while kneading the silane graft batch with the flame retardant batch and the catalyst batch, and asperities are easily formed on the product. Thus, workability and surface appearance are easily impaired.

The flame retardant batch is prepared by mixing the olefin resin with the flame retardant containing the metal hydroxide. In preparing the flame retardant batch, the metal hydroxide is added to the olefin resin, for example, and they are heated and kneaded preferably by using an extruder.

An antioxidant, a lubricant, a processing aid, a coloring agent, an inorganic filler, a copper inhibitor, and other agents may be added to the flame retardant batch as appropriate. The addition of the antioxidant further improves heat resistance. The addition of the lubricant minimizes degradation of workability caused by the addition of the flame retardant and improves workability.

The olefin resin of the flame retardant batch may be the same as one of the examples of the olefin resin of the silane graft batch. The olefin resin of the flame retardant batch is preferably the same as the olefin resin of the silane graft batch. The density of the olefin resin of the flame retardant batch is preferably within the range of 0.880 to 0.901 g/cm$^3$.

In view of improving gasoline resistance, the flame retardant batch may contain polyolefin whose melting point is 140° C. or more. Examples of the polyolefin whose melting point is 140° C. or more include a polypropylene elastomer.

The amount of the polyolefin whose melting point is 140° C. or more is preferably within the range of 5 to 20 part by mass with respect to 100 part by mass of the resin portion of the flame retardant batch. If the amount of the polyolefin whose melting point is 140° C. or more is less than 5 part by mass, the effect of improving gasoline resistance is easily lowered. If the amount is more than 20 part by mass, flexibility is easily lowered.

Examples of the metal hydroxide include magnesium hydroxide, aluminum hydroxide, calcium hydroxide, zirconium hydroxide, and barium hydroxide. Among them, magnesium hydroxide and aluminum hydroxide are preferable.

The amount of the metal hydroxide is preferably within the range of 100 to 500 part by mass with respect to 100 part by mass of the resin portion of the flame retardant batch. If the amount of the metal hydroxide is less than 100 part by mass, flame retardancy is easily lowered. If the amount is more than 500 part by mass, elongation is excessively lowered.

Examples of the antioxidant include a phenolic antioxidant, a sulfurous antioxidant, and a phosphorus antioxidant. They may be used singly or in combination.

Examples of the phenolic antioxidant include tetrakis[methylene-3-(3,5-di-t-butyl-4-hydroxyphenyl)propionate]methane.

Examples of the sulfurous antioxidant include pentaerythritol-tetrakis(beta-lauryl-thio-propionate).

The amount of the antioxidant is preferably within the range of 0.1 to 10 part by mass and is more preferably 3 to 5 part by mass with respect to 100 part by mass of the resin portion of the flame retardant batch. If the amount of the antioxidant is less than 0.1 part by mass, the effect of improving heat resistance is easily lowered. If the amount is more than 10 part by mass, the antioxidant easily blooms.

Examples of the lubricant include a stearic acid and fatty acid amide.

The amount of the lubricant is preferably within the range of 0.1 to 10 part by mass and is more preferably within the range of 0.5 to 3 part by mass with respect to 100 part by mass of the resin portion of the flame retardant batch. If the amount of the lubricant is less than 0.1 part by mass, the effect of reducing adhesion between the conductor and the insulator is not delivered. If the amount is more than 10 part by mass, the antioxidant easily blooms.

The catalyst batch is prepared by mixing the olefin resin with the silane crosslinking catalyst which cross-links the silane-grafted olefin resin of the silane graft batch. In preparing the catalyst batch, the silane crosslinking catalyst is added to the olefin resin, for example, and they are heated and kneaded preferably by using an extruder.

The olefin resin of the catalyst batch may be the same as one of the examples of the olefin resin of the silane graft batch. The density of the olefin resin of the catalyst batch is not specifically limited. It is essential only that the olefin resin of the catalyst batch be an olefin resin which is easily mixed with the olefin resin of the silane graft batch and the olefin resin of the flame retardant batch.

Examples of the olefin resin of the catalyst batch include linear low density polyethylene (LLDPE), low density polyethylene (LDPE), metallocene linear low density polyethylene, and metallocene ultralow density polyethylene. They may be used singly or in combination.

The silane crosslinking catalyst is a silanol condensation catalyst which silane-crosslinks the silane-grafted olefin resin of the silane graft batch. Examples of the silane cross linking catalyst include metal carboxylate of tin, zinc, iron, lead, and cobalt, titanate, organic base, inorganic acid, and organic acid.

More specifically, examples of the silane crosslinking catalyst include dibutyltin dilaurate, dibutyltin dimalate, dibutyltin mercaptide (dibutyltin bis-octylthioglycolate, dibutyltin beta-mercaptopropionate polymer), dibutyltin diacetate, dioctyltin dilaurate, tin acetate, tin caprylate, lead naphthenate, cobalt naphthenate, barium stearate, calcium stearate, tetrabutyl titanate, tetranonyl titanate, dibutylamine, hexylamine, pyridine, sulfuric acid, hydrochloric acid, toluenesulfonic acid, acetate, stearic acid, and maleic acid. Among them, dibutyltin dilaurate, dibutyltin dimalate, and dibutyltin mercaptide are preferable.

The amount of the silane crosslinking catalyst is preferably within the range of 0.5 to 5 part by mass and is more preferably within the range of 1 to 5 part by mass with respect to 100 part by mass of the resin portion of the catalyst batch. If the amount of the silane crosslinking catalyst is less than 0.5 part by mass, the degree of cross-linkage is easily lowered, and a desired heat resistance is not easily achieved. If the amount is more than 5 part by mass, surface appearance of the covering olefin resin is easily impaired.

Next, descriptions of an insulated wire and a process for producing the same according to the present invention will be provided.

The insulated wire according to the present invention is prepared by covering a conductor with the above-described flame-retardant silane-crosslinked olefin resin. The diameter, material, and other properties of the conductor are not specifically limited and may be determined depending on the intended use. The thickness of the insulating covering material is not specifically limited either and may be determined depending on the conductor diameter and other factors.

In the insulated wire according to the present invention, the degree of cross-linkage of the covering olefin resin is preferably 50% or more and is more preferably 60% or more in view of heat resistance. The degree of cross-linkage may be adjusted by adjusting the grafting amount of the silane coupling agent onto the olefin resin, the kind and amount of the crosslinking catalyst, water crosslinking conditions (temperature, time), and other factors.

The production of the insulated wire according to the present invention preferably includes heating and kneading the above-described silane graft batch, the above-described flame retardant batch, and the above-described catalyst batch, extrusion-covering the conductor with the composition of the kneaded batches, and water crosslinking the composition after the extrusion-covering step.

In the kneading step, the batches in pellet form are blended preferably by using equipment such as a mixer and an extruder. In the covering step, the composition of the kneaded batches is preferably subjected to extrusion-covering preferably by using a generally used extruder. The crosslinking step after the covering step is preferably performed by subjecting the resin covering the conductor of the wire to water vapor or water. The crosslinking is preferably performed at temperatures of ordinary temperature to 90° C. for 48 or fewer hours and is more preferably performed at temperatures of 60° C. to 80° C. for 12 to 24 hours.

EXAMPLE

A more detailed description of the present invention will now be provided specifically with reference to Examples. However, the present invention is not limited thereto.

(Material Used, Manufacturer, and Other Information)

Materials used in Example and Comparative Examples are provided below along with their manufacturers, trade names, and other information.

Polyethylene<1> [manuf.: DuPont Dow Elastomers Japan KK, trade name: Engage 8003]

Polyethylene<2> [manuf.: Nippon Unicar Company Limited, trade name: DFDJ7540]

Polypropylene elastomer (PP elastomer) [manuf.: Japan Polypropylene Corporation, trade name : NEWCON NAR6]

Magnesium hydroxide [manuf.: Kyowa Chemical Industry Co., Ltd., trade name: KISUMA 5]

Silane coupling agent [manuf.: Dow Corning Toray Co., Ltd., trade name: SZ6300]

Dicumyl peroxide (DCP) [manuf.: NOF CORPORATION, trade name: PERCUMYL D]

Tin catalyst (dibutyltin dilaurate) [manuf.: ADEKA CORPORATION, trade name: Mark BT-1]

EXAMPLE (Preparation of Silane Graft Batch)

A silane graft batch containing silane-grafted polyethylene was prepared. To be specific, A-materials at amass ratio shown in Table 1 were charged into a twin screw extruder and were heated and kneaded at 200° C. for 0.1 to 2 minutes. Then, the kneaded composition was formed into a pellet.

(Preparation of Flame Retardant Batch)

A flame retardant batch was prepared. To be specific, B-materials at a mass ratio shown in Table 1 were charged into a twin screw extruder and were heated and kneaded at 200° C. for 0.1 to 2 minutes. Then, the kneaded composition was formed into a pellet.

(Preparation of Catalyst Batch)

A catalyst batch was prepared. To be specific, C-materials at a mass ratio shown in Table 1 were charged into a twin screw extruder and were heated and kneaded at 200° C. for 0.1 to 2 minutes. Then, the kneaded composition was formed into a pellet.

(Preparation of Insulated Wire)

The silane graft batch (the A-materials), the flame retardant batch (the B-materials), and the catalyst batch (the C-materials) at a mass ratio of 30:70:5 shown in Table 1 were kneaded and extruded by using a hopper of an extruder at temperatures of about 180° C. to 200° C. A conductor having an external diameter of 2.4 mm was extrusion-covered with a composition of the kneaded batches defining an insulator with a thickness of 0.7 mm (an external diameter of the covering was 3.8 mm). Then, the composition was water crosslinked in a bath at a high humidity of 90% and at a high temperature of 85° C. for 24 hours. Thus, an insulated wire was prepared.

COMPARATIVE EXAMPLES 1 AND 2

Each of insulated wires according to Comparative Examples 1 and 2 was prepared. To be specific, materials at a mass ratio shown in Table 1 were charged at once into a twin screw extruder and were heated and kneaded at 200° C. for 0.1 to 2 minutes. A conductor was extrusion-covered with the kneaded composition in the same manner as Example, and the kneaded composition was water crosslinked.

COMPARATIVE EXAMPLE 3

(Preparation of Silane Graft Batch)

A silane graft batch according to Comparative Example 3 was prepared. To be specific, silane-grafted polyethylene was prepared by charging polyethylene<1>, polyethylene<2>, a PP elastomer, a silane coupling agent, and DCP among D-materials at a mass ratio shown in Table 1 into a twin screw extruder and heating and kneading them at 200° C. for 0.1 to 2 minutes, and the silane-grafted polyethylene was extruded. Magnesium hydroxide was added to the silane-grafted polyethylene, and they were kneaded by using a mixing roll. Then, the kneaded composition was formed into a pellet.

(Preparation of Catalyst Batch)

A catalyst batch was prepared. To be specific, E-materials at a mass ratio shown in Table 1 were charged into a twin screw extruder and were heated and kneaded at 200° C. for 0.1 to 2 minutes. Then, the kneaded composition was formed into a pellet.

(Preparation of Insulated Wire)

An insulated wire was prepared. To be specific, the silane graft batch (the D-materials) and the catalyst batch (the E-materials) at a mass ratio of 100:5 shown in Table 1 were charged into a twin screw extruder and were heated and kneaded at 200° C. for 0.1 to 2 minutes. A conductor was extrusion-covered with the kneaded composition, and the kneaded composition was water crosslinked.

Each of the obtained insulated wires was subjected to evaluation of surface appearance after extrusion. In addition, each of the obtained insulated wires was evaluated for product properties, i.e., measured for tensile strength, tensile elongation, and gel content. The results are shown in Table 1. In addition, descriptions of the evaluation method and the measurement method are provided below.

(Evaluation of Surface Appearance After Extrusion)

The product with good surface property was evaluated as "Good", and the product with surface asperities and roughness was evaluated as "Bad".

Property Evaluation (Tensile Strength and Tensile Elongation)

Tensile strength and tensile elongation were measured by a tensile test in accordance with JIS C 3005. To be specific, the insulated wire was cut to a length of 150 mm, and the conductor was removed therefrom, so that a tubular test piece including only the insulating covering material was obtained. Then, at a room temperature of 23° C. plus or minus 5° C., the both ends of the test piece were attached to chucks of a tensile tester and were pulled at a tensile speed of 200 mm/min, and the load and elongation at the time of break of the test piece were measured.

(Gel Content)

The gel content was measured in accordance with JASO D608-92. To be specific, about 0.1 g of insulating test material for an electric wire was weighed out and put in a test tube, to which 20 ml xylene was added, and then, the test material was heated in a constant temperature oil bath at 120° C. for 24 hours. Then, the test material was taken out from the test tube, was dried in a dryer at 100° C. for 6 hours. The dried test material was cooled to a room temperature and was precisely weighed. The percentage of the mass of the test material after the test to the mass of the test material before the test defines the gel content. The standard of the gel content is 50% or more. The gel content is generally used for crosslinked wires as an index of the water crosslinking state.

TABLE 1

| | | Example A:B:C = 30:70:5 | | | Comparative Example 1 Charge at once | Comparative Example 2 Charge at once | Comparative Example 3 D:E = 100:5 | |
|---|---|---|---|---|---|---|---|---|
| Material ratio (Mass ratio) | | A-materials | B-materials | C-materials | | | D-materials | E-materials |
| Composition | Polyethylene<1> | 70 | | 100 | 100 | 60 | 60 | 100 |
| | Polyethylene<2> | | 30 | | | 30 | 30 | |
| | PP elastomer | | | | | 10 | 10 | |
| | Magnesium hydroxide | | 90 | | 100 | 100 | 90 | |
| | Silane coupling agent | 3.5 | | | 5 | 4.5 | 4.5 | |
| | DCP | 0.07 | | | 0.1 | 0.09 | 0.09 | |
| | Tin catalyst | | | 3 | 0.15 | 0.15 | | 3 |
| Evaluation | Surface appearance after extrusion | | Good | | Bad | Bad | Bad | |
| Property | Tensile strength (MPa) | | 18 | | 12 | 18 | 18 | |

TABLE 1-continued

|  | Example A:B:C = 30:70:5 | | | Comparative Example 1 Charge at once | Comparative Example 2 Charge at once | Comparative Example 3 D:E = 100:5 | |
| --- | --- | --- | --- | --- | --- | --- | --- |
| Material ratio (Mass ratio) | A-materials | B-materials | C-materials | | | D-materials | E-materials |
| Elongation (%) | | 380 | | 520 | 350 | 330 | |
| Gel content (%) | | 68 | | 79 | 78 | 75 | |

As shown in Table 1, the insulated wires according to Comparative Examples 1 to 3 are inferior in surface appearance after extrusion of the wire covering material. In preparing the wire covering material composition according to Comparative Examples 1 and 2, the materials of the composition were charged at once and were heated and kneaded, i.e., the magnesium hydroxide and the silane coupling agent were mixed at once. Thus, the silane coupling agent was easily hydrolyzed by water in the magnesium hydroxide, and therefore, graft reaction of the polyethylene was hindered, and a gel-like material on the covering material occurs to form asperities on the wire covering material.

In Comparative Example 3, after grafting the silane coupling agent onto the polyethylene, the magnesium hydroxide was mixed thereto. However, it is considered that apart of the silane coupling agent grafted onto the polyethylene is hydrolyzed before the molding step of extrusion-covering the conductor with the composition because the magnesium hydroxide is mixed before the molding step. Therefore, crosslinking reaction of the polyethylene was hindered, and a gel-like material occurs and appears on the covering material to form asperities there.

In contrast, the insulated wire according to Example is excellent in surface appearance after extrusion of the wire covering material. In Example, the polyethylene sufficiently silane-grafted and the magnesium hydroxide were kneaded in the kneading and molding step of extrusion-covering the conductor with the composition. Therefore, crosslinking of the polyethylene was efficiently promoted, and surface appearance after extrusion of the wire covering material became excellent.

In addition, the property evaluation shows that the insulated wire according to Example is excellent in tensile strength and tensile elongation, is excellent in the degree of cross-linkage which is obtained from the gel content value, and has no problem in the product quality.

The foregoing description of the shielded connector according to the preferred embodiments of the invention is not intended to be exhaustive or to limit the invention to the precise form disclosed, and modifications and variations are possible in the light of the above teachings or may be acquired from practice of the invention.

The invention claimed is:

1. A process of producing a flame-retardant silane-crosslinked olefin resin, the process comprising the steps of:

kneading and molding a silane graft batch containing a silane-grafted olefin resin prepared by graft polymerizing a silane coupling agent onto an olefin resin, a flame retardant batch prepared by mixing an olefin resin with a flame retardant containing metal hydroxide, and a catalyst batch prepared by mixing an olefin resin with a silane crosslinking catalyst; and water crosslinking a molding of the batches after the kneading and molding step.

2. The process according to claim 1, wherein:

a mass ratio of the flame retardant batch to the silane graft batch is in a range of 60:40 to 90:10; and an amount of the catalyst batch is in a range of 3 to 10 part by mass with respect to 100 part by mass of a component constituted of the silane graft batch and the flame retardant batch.

3. The process according to claim 1, wherein:

the silane graft batch is prepared by heating and mixing 100 part by mass of the olefin resin with 0.5 to 5 part by mass of the silane coupling agent and 0.025 to 0.1 part by mass of an uncombined radical generating agent;

the flame retardant batch is prepared by mixing 100 part by mass of the olefin resin with 100 to 500 part by mass of the metal hydroxide; and the catalyst batch is prepared by mixing 100 part by mass of the olefin resin with 0.5 to 5 part by mass of the silane coupling agent.

4. An insulated wire comprising:

a conductor; and a flame-retardant silane-crosslinked olefin resin prepared by the process according to claim 1 and arranged to cover the conductor.

5. A process of producing an insulated wire, the process comprising the steps of:

kneading a silane graft batch containing a silane-grafted olefin resin prepared by graft polymerizing a silane coupling agent onto an olefin resin, a flame retardant batch prepared by mixing an olefin resin with a flame retardant containing metal hydroxide, and a catalyst batch prepared by mixing an olefin resin with a silane crosslinking catalyst;

extrusion-covering a conductor with a composition of the kneaded batches; and water crosslinking the composition after the extrusion-covering step.

6. The process according to claim 2, wherein:

the silane graft batch is prepared by heating and mixing 100 part by mass of the olefin resin with 0.5 to 5 part by mass of the silane coupling agent and 0.025 to 0.1 part by mass of an uncombined radical generating agent;

the flame retardant batch is prepared by mixing 100 part by mass of the olefin resin with 100 to 500 part by mass of the metal hydroxide; and the catalyst batch is prepared by mixing 100 part by mass of the olefin resin with 0.5 to 5 part by mass of the silane coupling agent.

7. An insulated wire comprising:

a conductor; and a flame-retardant silane-crosslinked olefin resin prepared by the process according to claim 2 and arranged to cover the conductor.

8. An insulated wire comprising:

a conductor; and a flame-retardant silane-crosslinked olefin resin prepared by the process according to claim 3 and arranged to cover the conductor.

9. An insulated wire comprising:

a conductor; and a flame-retardant silane-crosslinked olefin resin prepared by the process according to claim 6 and arranged to cover the conductor.

* * * * *